United States Patent
Goldberg et al.

(10) Patent No.: US 10,357,020 B2
(45) Date of Patent: Jul. 23, 2019

(54) LIVESTOCK DISPLAY TAG

(71) Applicant: TADBIK ADVANCED TECHNOLOGIES Ltd (TAT), Petach Tikva (IL)

(72) Inventors: Guy Goldberg, Herzlia (IL); Gili Drori, Tel Aviv (IL)

(73) Assignee: TADBIK ADVANCED TECHNOLOGIES LTD (TAT), Petach Tikva (IL)

( * ) Notice: Subject to any disclaimer, the term of this patent is extended or adjusted under 35 U.S.C. 154(b) by 0 days.

(21) Appl. No.: 15/314,721

(22) PCT Filed: Apr. 8, 2016

(86) PCT No.: PCT/IL2016/050379
§ 371 (c)(1),
(2) Date: Nov. 29, 2016

(87) PCT Pub. No.: WO2016/166748
PCT Pub. Date: Oct. 20, 2016

(65) Prior Publication Data
US 2017/0202179 A1  Jul. 20, 2017

Related U.S. Application Data

(60) Provisional application No. 62/146,422, filed on Apr. 13, 2015.

(51) Int. Cl.
*A01K 11/00* (2006.01)

(52) U.S. Cl.
CPC .......... *A01K 11/004* (2013.01); *A01K 11/001* (2013.01); *Y02A 40/74* (2018.01)

(58) Field of Classification Search
CPC .... A01K 11/001; A01K 11/004; A01K 11/006
USPC .............................. 606/116; 40/301, 299.01
See application file for complete search history.

(56) References Cited

U.S. PATENT DOCUMENTS

| | | | |
|---|---|---|---|
| 4,920,671 A | 5/1990 | Zatkos | |
| 5,152,249 A | 10/1992 | Howe | |
| 5,429,393 A | 7/1995 | Parlo | |
| 5,725,261 A | 3/1998 | Rahn | |
| 6,100,804 A * | 8/2000 | Brady | G06K 19/07749 257/678 |
| 6,613,179 B1 | 9/2003 | McCoy et al. | |

(Continued)

FOREIGN PATENT DOCUMENTS

| | | |
|---|---|---|
| WO | 2007095684 A1 | 8/2007 |
| WO | 2009089215 A1 | 7/2009 |
| WO | 2013013836 A1 | 1/2013 |

*Primary Examiner* — Sarah A Simpson
(74) *Attorney, Agent, or Firm* — Paul D. Bianco; Fleit Gibbons Gutman Bongini & Bianco PL

(57) ABSTRACT

A livestock pasture display tag of a type used under harsh agricultural conditions, the tag comprising: (i) a thin, substantially, flat planar flexible display having a thickness, a front planar surface and a back planar surface, both surfaces are substantially parallel to a longitudinal axis positioned between surfaces; at least one of said surfaces is having a display section in which the livestock animal indicia is displayed; (ii) an anchoring section for fixedly securing the improved livestock pasture display tag to a body part surface of the livestock animal; and (iii) a permanent pressure sensitive encapsulation zone.

35 Claims, 11 Drawing Sheets

(56) References Cited

U.S. PATENT DOCUMENTS

| | | |
|---|---|---|
| 6,758,000 B2 | 7/2004 | Sandt et al. |
| 8,573,502 B2 | 11/2013 | McCoy |
| 2001/0046126 A1 | 11/2001 | Colello |
| 2007/0124966 A1* | 6/2007 | Robadey .............. A01K 11/001 40/301 |
| 2008/0222930 A1* | 9/2008 | Pennington .......... A01K 11/001 40/301 |
| 2009/0094869 A1 | 4/2009 | Geissler et al. |
| 2011/0121356 A1* | 5/2011 | Krawinkel .............. C03C 27/10 257/100 |
| 2011/0203144 A1* | 8/2011 | Junek ................... A01K 11/001 40/300 |
| 2016/0143719 A1* | 5/2016 | Folkers ................ A01K 11/006 600/33 |

\* cited by examiner

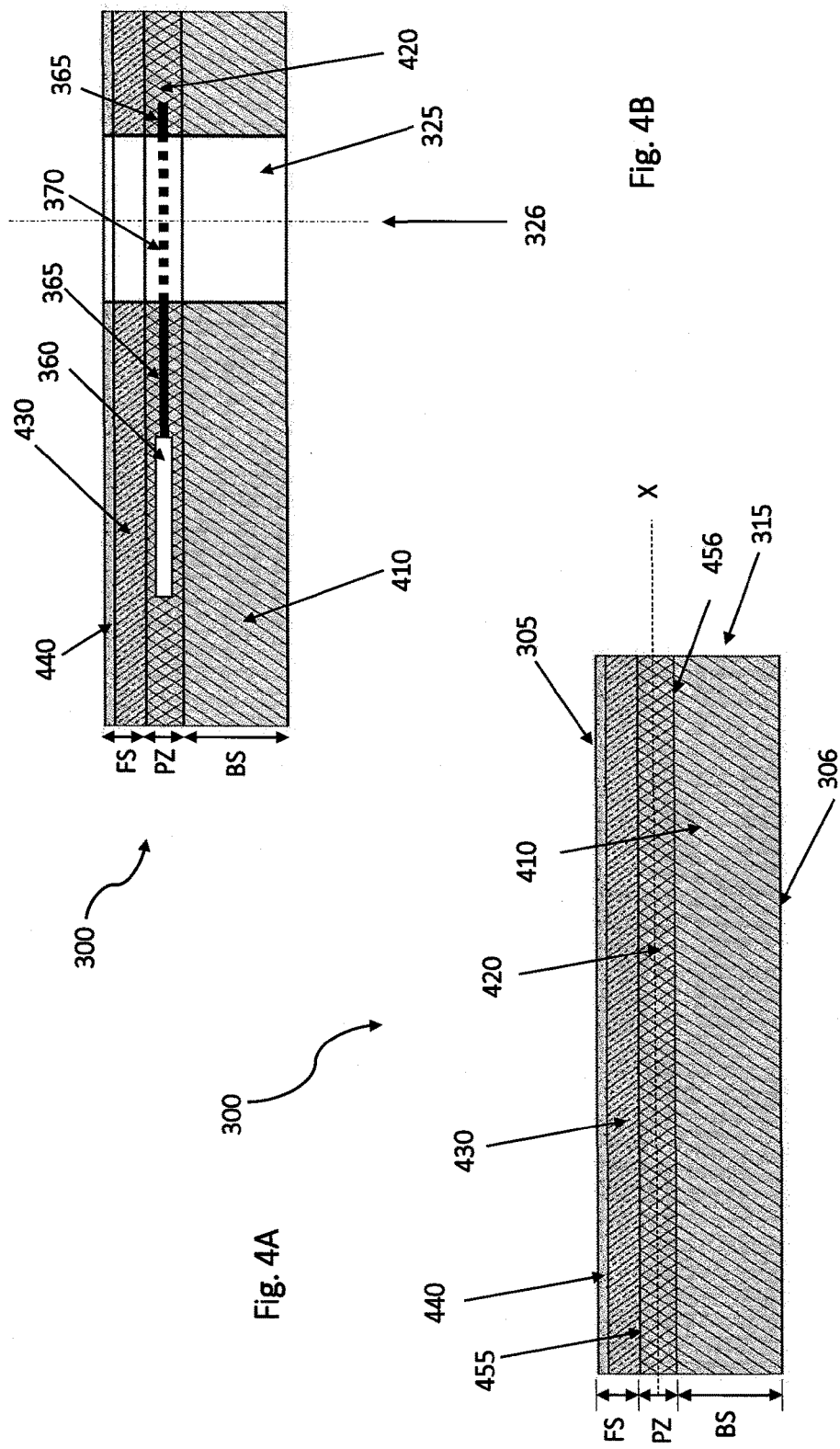

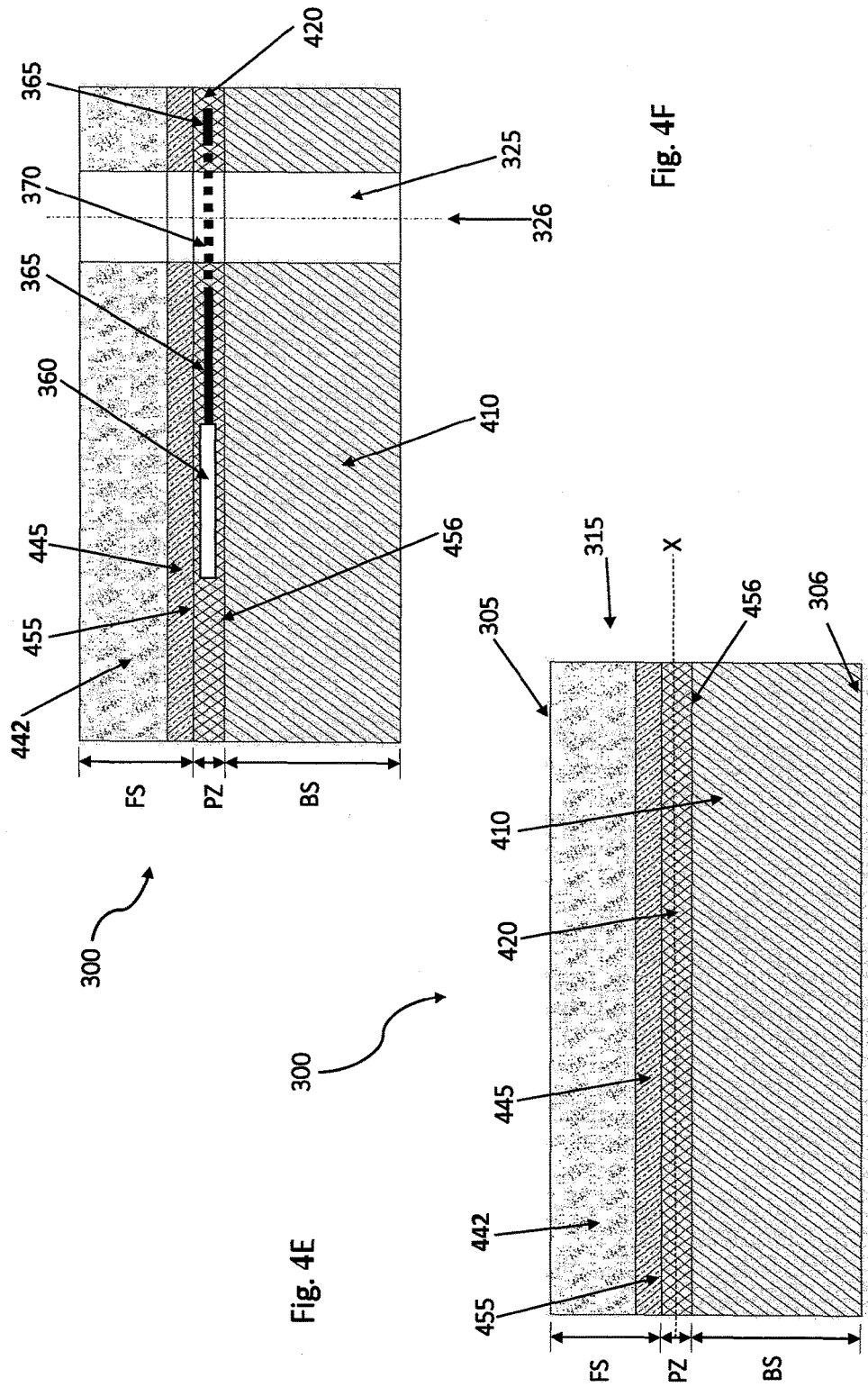

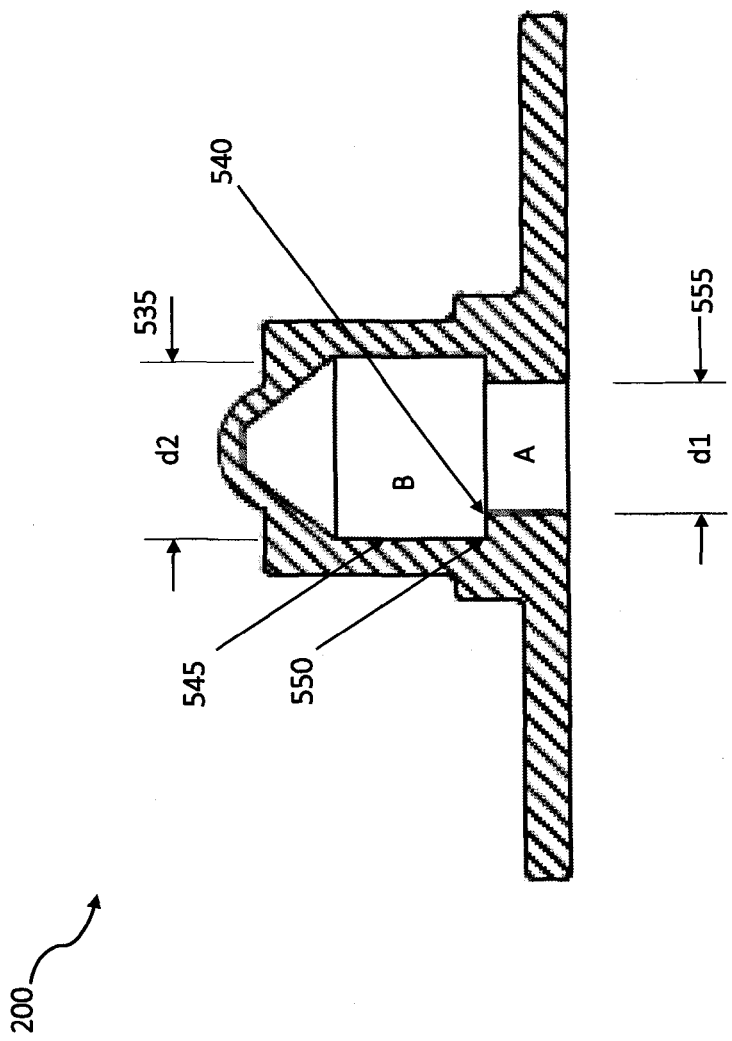

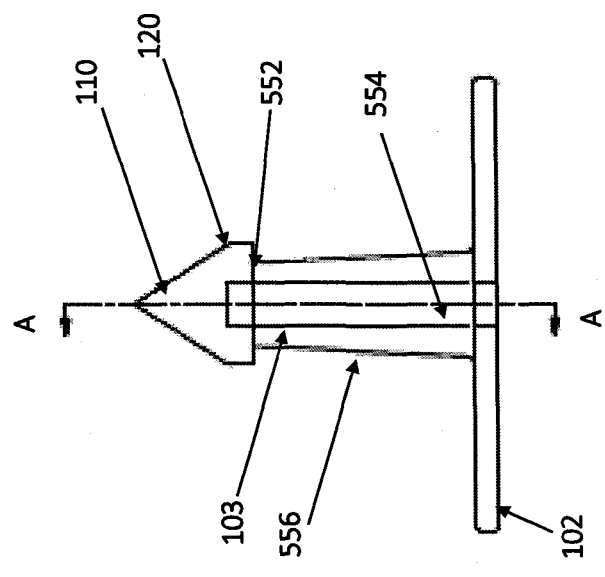

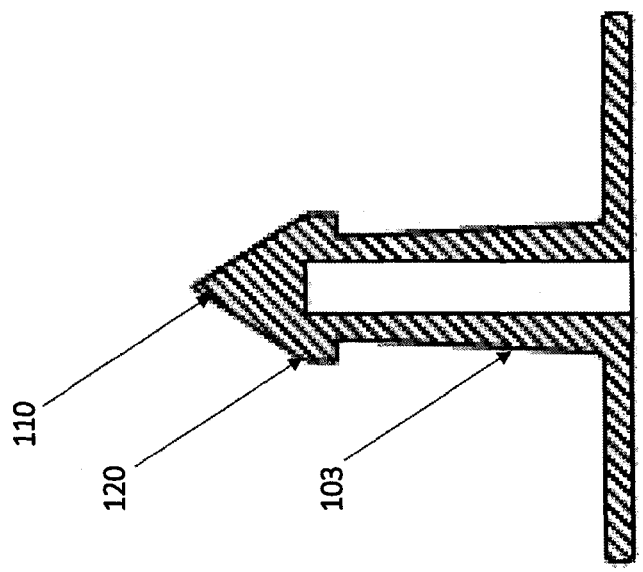

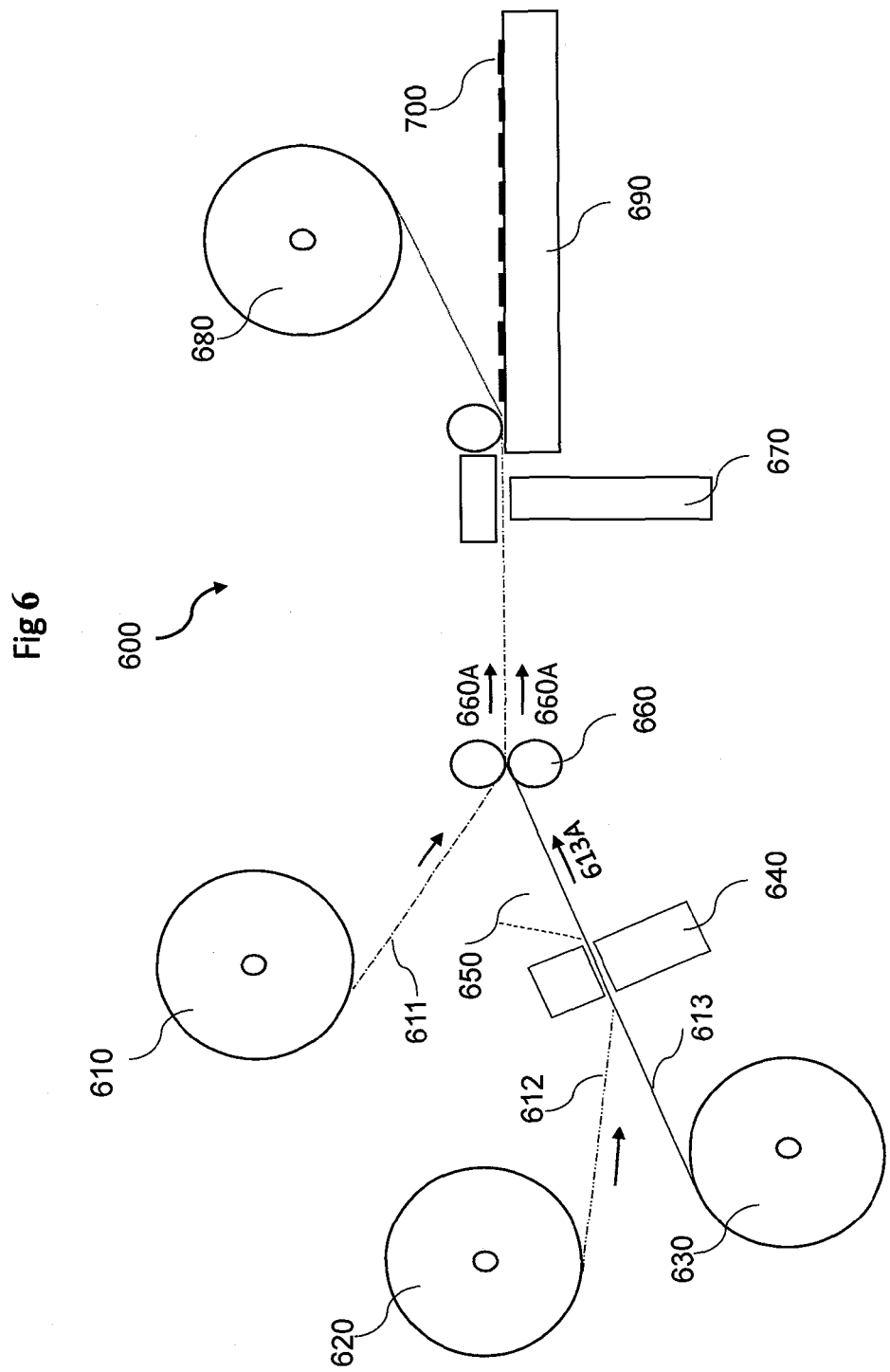

LIVESTOCK DISPLAY TAG

BACKGROUND

The loss of the tags from livestock is a common problem. When animal tags are lost the history, genetic recordings, and other data like veterinary related records is lost as well. Several methods are commonly adopted to increase tag retention. Animal tags are made of heat-seal layered thermoplastics, of size and weigh to provide resilience in difficult everyday animal conditions.

An example of the prior art technique is found in U.S. Pat. No. 5,725,261 to Rahn disclosing a continuous roll lamination process of plastic substrates under heat and pressure at a temperature and pressure sufficient to cause the plastic material to penetrate the interstices of the substrate and form a unitary resilient plastic structure. The lamination station typically applies about 270-330° F.

The technique was improved in U.S. Pat. No. 6,758,000 to Sandt et al disclosing livestock identification tag assembly comprising: a heat seal laminate comprising: (i) a facestock having an upper surface and a lower surface; (ii) a heat-activatable adhesive layer having an upper surface and a lower surface, wherein the upper surface of the heat-activatable adhesion layer is adhered to the lower surface of said facestock; (iii) an ink or graphics layer adhered to the lower surface of said heat-activatable layer; and (b) a flexible polymeric substrate; wherein the lower surface of the heat-activatable adhesive of the laminate is adhered to the substrate. In one embodiment, the ink or graphics layer is positioned between said heat-activatable adhesive layer and said facestock.

Commonly used animal identification tags are described and covered by such U.S. Pat. Nos. 4,920,671, 5,152,249, 5,429,393, 5,725,261, 6,613,179, 6,758,000, WO2007/095684, 8,573,502, many of them marketed commercially in the United States.

WO/2009/089215 discloses an animal tag and methods for making an animal tag include a primary body of material (e.g., that includes a circuit holding portion and an animal attachment portion), a circuit assembly, and a cover configured to cover the circuit assembly. The cover is welded to the primary body of material using light radiation.

The prior art animal tags employ thermoplastic welding utilizing, inter alia, heat or radiation in combination pressure to melt the tag layers so as to fuse and heat-seal the thermoplastic layers. To that end, the prior art employs heat activated adhesives. Needless to say, application of heat/radiation complicates the manufacturing process resulting with increased cost.

Another disadvantage of the prior art tags stems from the damage which inevitably occurs to electronic components found in proximity to the increased heat.

In addition, application of heat reduces the scope of materials which can be employed forcing the engineering of animal tags to utilize generally softer thermoplastic with increased thickness, use laser welding, use embedded melting flux cores and plastic molding.

SUMMARY OF THE INVENTION

It is the object of the present invention to introduce new materials and techniques to high volume production of livestock tag as well as reducing the cost of manufacture and improving their outdoor pasture use.

The techniques of the present invention permits application of mere pressure to the components of the tag at cool temperature range to achieve intimate contact and form the required mechanical bond between the components.

In accordance with the present invention, there is no need for the heat-activating substances or application of heat to achieve the necessary bond. There is no need to other common technique as laser infrared assembly method (IRAM) or ultrasonic welding which are normally used to create heat-seal regions.

The application of pressure is not detrimental to the tag itself and the cool temperature range is well suited for incorporation of electronics and heat vulnerable elements.

Therefore, in a first aspect the invention is directed to an improved livestock pasture display tag of a type used under harsh agricultural conditions, said tag comprising:

(i) a thin, substantially, flat planar flexible display having a thickness, a front planar surface and a back planar surface, both surfaces are substantially parallel to a longitudinal axis positioned between surfaces; the front surface is having a display section in which the livestock animal indicia is displayed;

(ii) an anchoring section for fixedly securing the improved livestock pasture display tag to a body part surface of the livestock animal; the improved livestock pasture display tag does not delaminate under harsh agricultural conditions; and (iii) a permanent pressure sensitive encapsulation zone extending along the longitudinal axis between the back and front surfaces having a front side facing the front surface, defining a front section there-between and a front interface; and a back side facing the back surface, defining a back section there-between and a back interface; the permanent pressure sensitive encapsulation zone permanently bonds the front section at the front interface, the back section at the back interface, and accommodates a radio frequency identification component, the radio frequency identification component is permanently bonded between the back and front sections.

In some embodiments, the present invention relates to an improved livestock pasture display tag, said tag comprising:

(i) a thin, substantially, flat planar flexible display having a thickness, a front planar surface and a back planar surface, both surfaces are substantially parallel to a longitudinal axis positioned between surfaces; at least one of said surfaces is having a display section in which the livestock animal indicia is displayed;

(ii) an anchoring section for fixedly securing the improved livestock pasture display tag to a body part surface of the livestock animal; and (iii) a permanent pressure sensitive encapsulation zone extending along the longitudinal axis between the back and front surfaces having:
   a front side perimeter that is facing the front planar surface, defining a front section there-between and a front interface;
   a back side perimeter that is facing the back planar surface, defining a back section there-between and a back interface;
   the permanent pressure sensitive encapsulation zone configured to (1) permanently bond the front section at the front interface, and the back section at the back interface; and (2) accommodate a permanently bonded radio frequency identification component between the back and front sections; the improved livestock pasture display tag does not delaminate under harsh agricultural conditions.

The anchoring section can be a punch out section configured to receive there through, from the front surface, a portion of a male piercing member comprising a pointed head and an elongate shaft extending from the head, the male piercing member has a retention surface to secure the livestock pasture display tag on an anchor; characterized in that the improved display tag is invasively fixable to animal soft tissue point.

In some embodiments, the permanent bonding of the radio frequency identification component is affected by application of sufficient mechanical pressure onto the thickness of the permanent pressure sensitive encapsulation zone at a cool temperature range. The temperature can range between 50° F. to 140° F. In one embodiment, the cool temperature range can be selected to be room temperature (RT) range.

In some embodiments, the permanent pressure sensitive encapsulation zone is un-melted. In one embodiment the back section is un-melted and the front section is also un-melted.

In some embodiments, the zone comprises of acrylic based or rubber based permanent pressure sensitive adhesive.

The permanent pressure sensitive encapsulation zone can completely separate the front section from the back section. In some embodiments, the front section is not fused with the back section.

The back section can comprise a support layer of a resilient and flexible thermoplastic material. The resilient and flexible thermoplastic material can be polyethylene terephthalate (PET).

The thickness of the resilient and flexible thermoplastic material can be in the range of 150 micron to 350 micron. In an embodiment, the back section consists of polyethylene terephthalate (PET). In some embodiments, the front section comprises a flexible thermoplastic material. The front section can be a vinyl, poly vinyl or Polyvinyl chloride (PVC). The thickness of the flexible thermoplastic material can be in the range of 50 micron to 100 micron.

The permanent pressure sensitive encapsulation zone can be of thickness in the range of 10 micron to 50 micron prior to encapsulation of the electronic component.

In one embodiment, the overall weigh of the display tag is less than 3 grams. In some embodiments, the overall weigh of the display tag is less than 2.5 grams. In one embodiment, the overall weigh of the display tag is less than 2.4 grams.

In some embodiments, the overall weigh of the display tag is less than 0.1 g/cm$^2$.

The tag can be configured and adapted to prevent accumulation of laminate fold lines. To that end, the front section can comprise a flexible thermoplastic bilayer. The permanent pressure sensitive encapsulation zone can be of thickness in the range of 20 micron to 90 micron prior to encapsulation of the electronic component; the overall weigh of the display tag can further b less than 0.15 gr/cm$^2$.

The thermoplastic bilayer can comprise polyvinyl chloride (PVC) layer laminated to polyethylene terephthalate (PET). In another embodiment, the thermoplastic bilayer can comprise polyvinyl chloride (PVC) layer laminated to polycarbonate (PC) layer.

The thermoplastic bilayer can be of thickness in the range of 300 micron to 750 micron.

The back section can comprise a support layer of a resilient and flexible thermoplastic material of thickness in the range of 300 micron to 750 micron. The resilient and flexible thermoplastic material can be polyethylene terephthalate (PET); the overall weigh of the display tag being less than 8 grams; and the overall thickness measured from the front surface to the back surface can be 450 micron to 1500 micron. The radio frequency identification component can be a UHF identification component. The flexible thermoplastic material can be printed with indicia.

In some embodiments, at least portion of the front section comprises a reflective film to provide animal identification during darkness.

The improved display tag can be fabricated by continuous roll to roll manufacturing procedure.

The present invention further relates to, the improved tag or other tri-layered laminate having a display tag tear attempt indication. The display tag tear attempt indication can be generated by circuit disconnection at a circuit sensitivity region.

In some embodiments, the sensitivity region is a circuit loop circumventing at least a portion of an anchoring section such that tear attempt of the anchoring section disconnects the circuit loop; the disconnection of which is indicative of the tear attempt. The anchoring section can be the anchoring section of the improved livestock pasture display tag disclosed herein. In one embodiment, the display tag tear attempt indication can be used with 3 (or more) layered laminates even other than the improved livestock pasture display tag disclosed herein.

In a second aspect, the present invention is directed an improved livestock pasture display tag of a type used under harsh agricultural conditions, said tag comprising:

(i) a thin, substantially, flat planar flexible display having a thickness, a front planar surface and a back planar surface, both surfaces are substantially parallel to a longitudinal axis positioned between surfaces; the front surface is having a display section in which the livestock animal indicia is displayed;

(ii) an anchoring section for fixedly securing the improved livestock pasture display tag to a body part surface of the livestock animal; the improved livestock pasture display tag does not delaminate under harsh agricultural conditions; and (iii) a display tag tear attempt indication.

The display tag tear attempt indication can be generated by circuit disconnection at a circuit sensitivity region.

In some embodiments, the sensitivity region is a circuit loop circumventing at least a portion of the anchoring section such that tear attempt of the anchoring section disconnects the circuit loop; the disconnection of which is indicative of the tear attempt.

In a third aspect the invention is directed to an improved livestock pasture display tag of a type used under harsh agricultural conditions, said tag comprising:

(i) a thin, substantially, flat planar flexible display having a thickness, a front planar surface and a back planar surface, both surfaces are substantially parallel to a longitudinal axis positioned between surfaces; the front surface is having a display section in which the livestock animal indicia is displayed;

(ii) an anchoring section for fixedly securing the improved livestock pasture display tag to a body part surface of the livestock animal; the improved livestock pasture display tag does not delaminate under harsh agricultural conditions;

(iii) an encapsulation zone extending along the longitudinal axis between the back and front surfaces having a front side facing the front surface; the encapsulation zone accommodates a radio frequency identification component, the radio frequency identification component is permanently bonded between the back and front sections;

characterized in that the overall thickness measured from the front surface to the back surface is below 1.5 mm. In some embodiments, the overall thickness measured from the front surface to the back surface is below 1000 microns. In some embodiments, the overall thickness measured from the front surface to the back surface is below 500 microns. In some embodiments, the overall thickness measured from the front surface to the back surface is approximately in the range of 450 microns to 1 mm.

In one embodiment, the overall weigh of the display tag is less than 3 grams. In some embodiments, the overall weigh of the display tag is less than 2.5 grams. In one embodiment, the overall weigh of the display tag is less than 2.4 grams. In some embodiments, the overall weigh of the display tag is less than 0.15 g/cm$^2$.

In a fourth aspect, the present invention is directed to a method for manufacturing an improved livestock pasture display tag for usage under harsh agricultural conditions, the method comprising:

(i) obtaining a first resilient thermoplastic substrate; the upper surface of the first thermoplastic substrate is coated with a permanent pressure sensitive encapsulation layer;

(ii) obtaining a radio frequency identification component and disposing the radio frequency identification component on the permanent pressure sensitive encapsulation layer;

(iii) obtaining a top thermoplastic layer;

(iv) providing permanent bonding of:
The first resilient thermoplastic substrate;
the permanent pressure sensitive encapsulation layer; and
the top thermoplastic layer
characterized in that the bonding is effected by application of sufficient mechanical pressure onto the thickness of the permanent pressure sensitive encapsulation layer at a cool temperature range during the entire manufacture process;
thereby obtaining a tri-layered laminate; the laminate accommodates the radio frequency identification component; wherein the radio frequency identification component is permanently bonded between the first resilient thermoplastic substrate and the top thermoplastic layer; and (v) punching out an aperture defining an anchoring point for fixedly securing the improved livestock pasture display tag to a body part surface of the livestock animal; wherein the improved livestock pasture display tag does not delaminates under harsh agricultural conditions.

In some embodiments, the improved livestock pasture display tag is tested for not delaminating under harsh agricultural conditions.

In some embodiments, the temperature ranges between 50° F. and 140° F.

In other embodiments, the cool temperature range can be selected to be a room temperature (RT) range.

The permanent pressure sensitive encapsulation layer is un-melted during manufacture.

In some embodiments, the permanent pressure sensitive encapsulation layer comprises of permanent pressure sensitive acrylic adhesive.

In some embodiments, the substrate thermoplastic material is polyethylene terephthalate (PET). The top layer can be a vinyl, poly vinyl or Polyvinyl chloride (PVC).

In some embodiments, the overall thickness measured from the front surface to the back surface is below 1 mm. In some embodiments, the overall thickness measured from the front surface to the back surface is below 700 microns. In some embodiments, the overall thickness measured from the front surface to the back surface is below 500 microns. In some embodiments, the overall thickness measured from the front surface to the back surface is approximately in the range of 450 microns to 1 mm.

In some embodiments, the overall weigh of the display tag is less than 0.1 g/cm$^2$.

The manufacturing process can be configured and adapted such that the top thermoplastic layer comprises flexible thermoplastic bilayer; and the permanent pressure sensitive encapsulation layer is of thickness in the range of 20 micron to 90 micron prior to encapsulation of the radio frequency identification component. The thermoplastic bilayer can be comprised of polyvinyl chloride (PVC) layer laminated to polyethylene terephthalate (PET). In other embodiments, the thermoplastic bilayer comprises polyvinyl chloride (PVC) layer laminated to polycarbonate (PC) layer; the thermoplastic bilayer can be of thickness in the range of 300 micron to 750 microns; and the measured thickness of the first resilient thermoplastic substrate can be in the range of 300 micron to 750 micron.

In some embodiments, the overall thickness of the tri-layered laminate is 450 micron to 1500 micron; and the overall weigh of the laminate can be less than 0.15 gr/cm$^2$.

In a fifth aspect, the present invention is directed to an assemblage for use in management of animals under harsh agricultural conditions, comprising:

(i) An improved livestock pasture display tag of a type used under harsh agricultural conditions, said tag comprising:

(1) a thin, substantially, flat planar flexible display having a thickness, a front planar surface and a back planar surface, both surfaces are substantially parallel to a longitudinal axis positioned between surfaces; the front surface is having a display section in which the livestock animal indicia is displayed;

(2) a punch out section defining an anchoring point for fixedly securing the improved livestock pasture display tag to a body part surface of the livestock animal; the improved livestock pasture display tag does not delaminates under harsh agricultural conditions; and (3) a permanent pressure sensitive encapsulation zone extending along the longitudinal axis between the back and front surfaces having a front side facing the front surface, defining a front section there-between and a front interface; and a back side facing the back surface, defining a back section there-between and a back interface, the permanent pressure sensitive encapsulation zone permanently bonds the front section at the front interface, the back section at the back interface, and accommodates a radio frequency identification component, the radio frequency identification component is permanently bonded between the back and front sections;

(ii) a male piercing member comprising a pointed head and an elongate shaft extending from the head, the male piercing member has a retention surface to secure the livestock pasture display tag on an anchor;

In a sixth aspect, the present invention is directed to a method of management farm animal under harsh agricultural conditions, the method comprises:

(i) obtaining an improved livestock pasture display tag of a type used under harsh agricultural conditions, said tag comprising:

(1) a thin, substantially, flat planar flexible display having a thickness, a front planar surface and a back planar surface, both surfaces are substantially parallel to a longitudinal axis positioned between surfaces; the front surface is having a display section in which the livestock animal indicia is displayed;

(2) a punch out section defining an anchoring point for fixedly securing the improved livestock pasture display tag to a body part surface of the livestock animal; the improved livestock pasture display tag does not delaminates under harsh agricultural conditions; and (3) a permanent pressure sensitive encapsulation zone extending along the longitudinal axis between the back and front surfaces having a front side facing the front surface, defining a front section there-between and a front interface; and a back side facing the back surface, defining a back section there-between and a back interface, the permanent pressure sensitive encapsulation zone permanently bonds the front section at the front interface, the back section at the back interface, and accommodates a radio frequency identification component, the radio frequency identification component is permanently bonded between the back and front sections;

(ii) applying the improved livestock pasture display tag accommodating the radio frequency identification component onto an animal using a male piercing member and an anchor; characterized in that the improved display tag is invasively fixed in animal soft tissue.

In some embodiments, the method of management farm animal comprises setting RFID related information with accurate information of the animal.

The information can be at least one parameter selected from location, origin, medical record, disease control, history parameter.

In some embodiments, the method of management farm animal further comprises reading RFID related information. In an embodiments, the method of management farm animal further comprises repeatedly reading RFID related information, in spaced apart time zones.

BRIEF DESCRIPTION OF THE DRAWINGS

FIGS. 4A-4B illustrate a side cross sectional view of the improved display tag in accordance to the present invention.

FIGS. 4E-4F illustrate a side cross sectional view of the improved display tag in accordance with one embodiment of the present invention.

FIG. 5B is a cross sectional view of an anchor in accordance with some embodiments or the present invention.

FIG. 5C is a front view of an anchor in accordance with some embodiments or the present invention.

FIG. 5D is a cross sectional view of a male piercing member in accordance with some embodiments or the present invention.

FIG. 6 is a schematic diagram illustrating a roll to roll (R2R) method of manufacturing the improved livestock tag of the present invention.

DETAILED DESCRIPTION OF THE INVENTION

As used herein, "about" shall denotes +−/10%.

As used in the application and claims, the term "un-melted" and "unfused" refer to layer of substance which is not exposed to sufficient heat to cause any significant degree of melting to the substance during manufacture and in the final product.

Thus, as used in the application and claims, the term "un-melted permanent pressure sensitive adhesive" and "unfused permanent pressure sensitive adhesive" refer to a layer of permanent pressure sensitive adhesive which is not exposed to sufficient heat to cause any significant degree of melting. The term un-melted thermoplastic layer refers to an un-melted thermoplastic layer in a layered structure which is not exposed to sufficient heat to cause any significant degree of melting to the layer during manufacture and in the final product. The term un-melted PET refers to PET layer in a layered structure which is not exposed to sufficient heat to cause any significant degree of melting to the layer during manufacture and in the final product. The term un-melted PVC refers to a PVC layer in a layered structure which is not exposed to sufficient heat to cause any significant degree of melting to the layer during manufacture and in the final product.

Validation of the unfused property is verifiable via cross-sectioning the tag component in question to verify that the component is unfused with other adjacent components of the tag and analyzing the cross section under microscope, as known to the skilled artisan.

Figure 1:
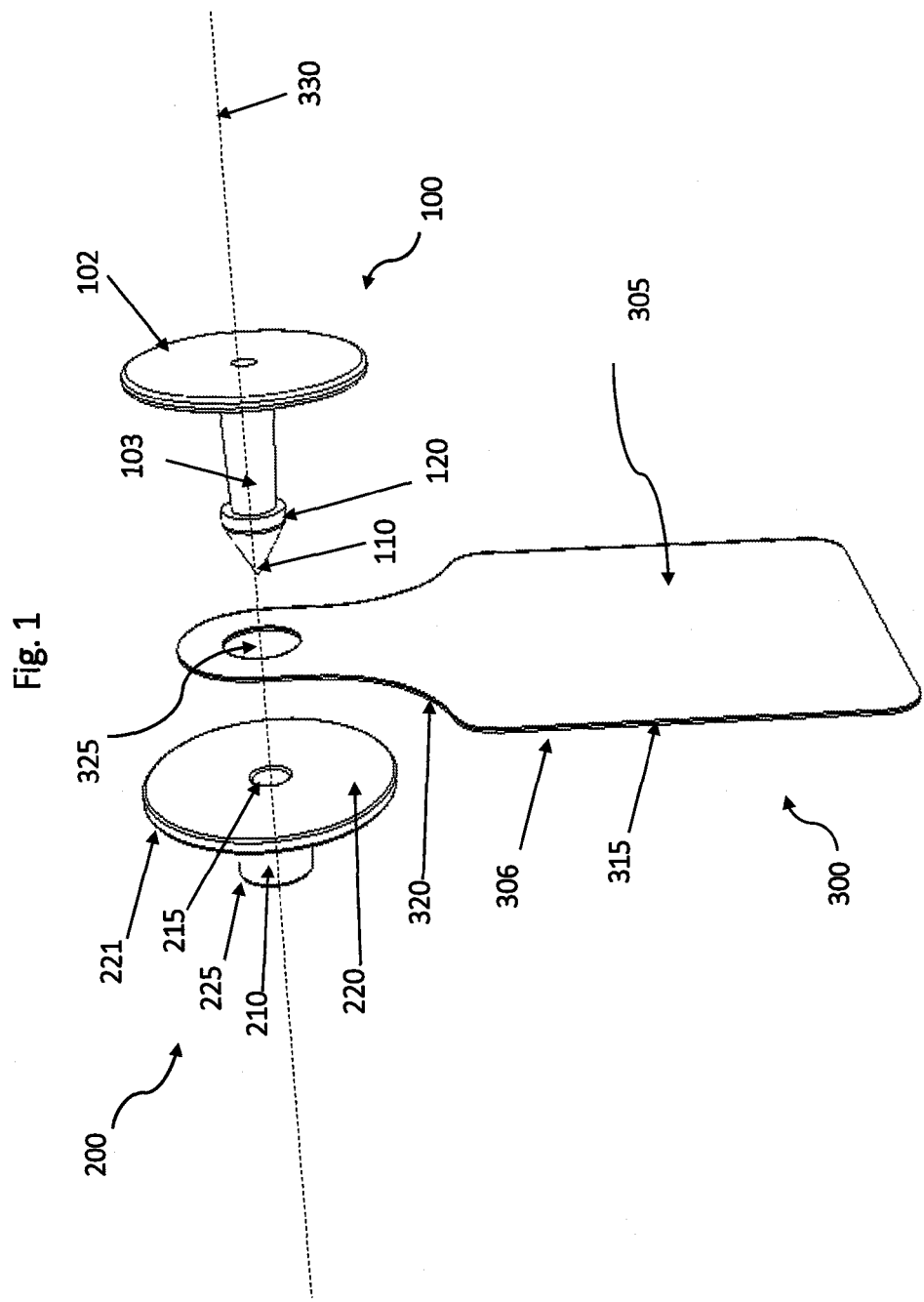
FIG. 1 is an exploded view of a livestock tag in accordance to the invention.

FIG. 1 is an exploded view of a livestock tag assemblage in accordance to the invention. In a preferred embodiment the livestock tag assemblage includes an anchoring element 200 which is used together with display tag 300. In the present invention, "display tag", "improved display tag" and "improved pasture display tag" are used interchangeably to denote the display tag 300.

The tag has an opening 325 which is used to permanently fix the tag on the livestock animal. In an embodiment, a piercing element 100 is used to be placed through the opening 325, and then pierce through the animal tissue to be anchored onto the anchoring element 200. The locking path of the male piercing into the anchoring element is denoted by axis 330. The piercing element 100 or the male piercing member has a retention surface 120. This is shown is FIG. 1 and FIG. 3.

Anchor 200 comprises a main-body 220, a central opening 215 for allowing directed entry of the male piercing member 100 there through. The main body includes a boss 225 to provide an attachment location or for bearing the male piercing member 100.

The anchor 200 also includes an anchoring inner shoulder 540 (shown in FIG. 5B) within the central opening or aperture 215 which defines a first diameter and a second larger diameter. In FIG. 5B, the first diameter is denoted as d1 and the second diameter is denoted as d2. During mounting procedure, the male piercing member is passed through the central opening 215 of the anchor 200 about the location of the first diameter. The retention surface 120 of the male piercing member typically has a larger diameter that first diameter but is of lesser diameter compared to the second diameter of the shoulder. The shoulder contacts the retention surface so as to prevent passage of the retention surface in a longitudinal direction while permitting passage in an opposite direction.

Figure 3:
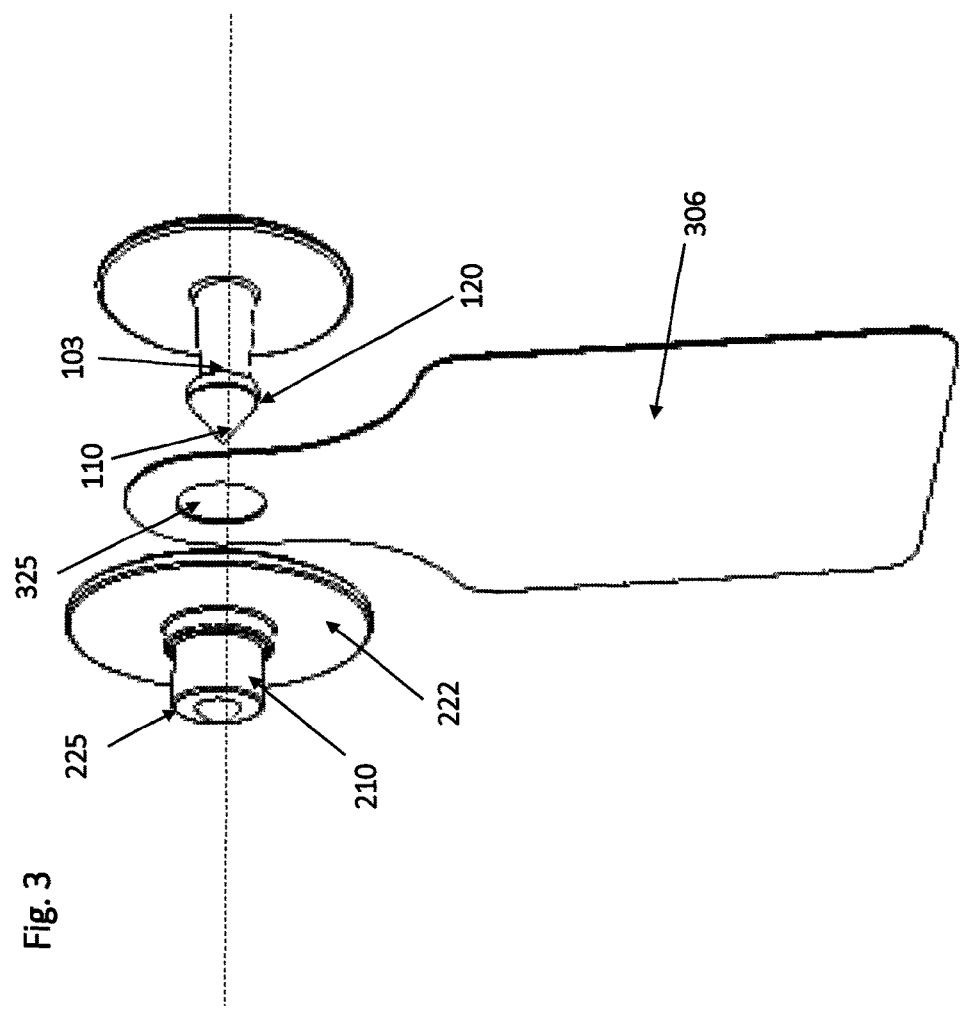
FIG. 3 illustrates an exploded view of an opposite view of the livestock tag assemblage in accordance to the invention.

Anchor 200 further includes a circumferential flange 221 projecting from an outer surface of the body 210. The anchor can be manufactured from various materials such as but not limited to polyurethanes, acetyl resins and alike. In some embodiments, anchor is manufactured from thermoplastic polyurethane (TPU) or other thermoplastic elastomer (TPE). The dimensions of the anchor 200 are typically have the size to fit commonly used male piercing parts having elongated shafts as shown in FIGS. 1 and 3. The elongated shaft is denoted as 103.

In an embodiment, the inner volume diameter d2 of the anchor boss is approximately 4.5 mm; the outside diameter of the boss can be about 7 mm; the anchor length is approximately 13 mm; the flange 221 width about 1.3 mm; The diameter of the central opening of the anchor d1 is about 3.2 mm, the width of which extend at A about 2.5 mm.

FIGS. 1 and 3 illustrate the male piercing member 100. The male piercing member has a pointed head 110 and a base 102. The pointed head is typically sufficiently sharp to enable easy cut to the animal tissue. In an embodiment, the pointed head is used to cut through animal tissue, through the aperture 325 of the tag, and then through the central opening 215. The pointed head when pushed in the central opening 215 is locked and thus secures the animal tag in a locked position on the livestock animal. The male piercing member has a retention surface 120. The retention surface is spaced from the pointing head 110. The diameter of the retention surface 120 is greater from the diameter of the elongated shaft 103 section in adjacency.

Figure 2:
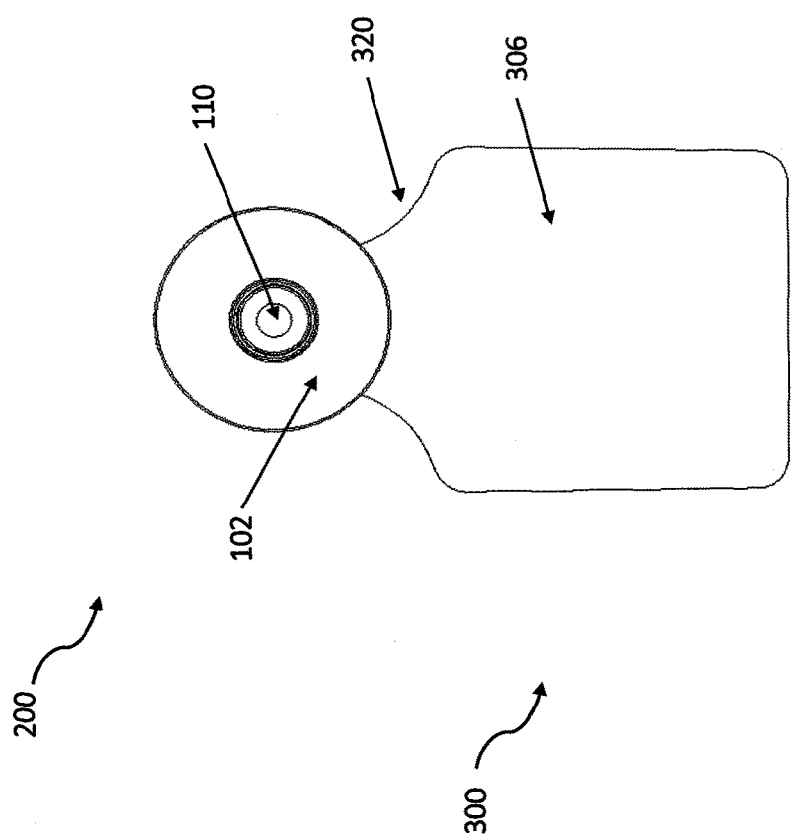
FIG. 2 illustrates a back exploded view of the livestock tag assemblage in an assembled state.

FIG. 2 shows a plan view of a display tag 300 in a locked state in accordance to the invention. In such locked state the anchor 200 male piercing member 100 and the display tag 300 are permanently affixed together. The tag typically carries the livestock details, in form of signs, letters and/or figures providing information of the herd or specific relevant data. The tag incorporates an electronic component which serves to electronically identify the livestock animal being marked. The permanently locked state secures the integrity of the information carried on the display tag or the information stored in conjunction with the electronic component (positioned within the layered structure as shown in FIGS. 4A and 4B). The locked state is irreversible such that the male piercing member 100, anchor 200, and the display tag 300 cannot be separated unless the physical integrity of at least one of the male piercing member 100, anchor 200, and the display tag 300 is physically damaged.

The use of the livestock tag is illustrated, for example, in FIGS. 1 and 3. The tag is used for marking livestock animal under harsh agricultural conditions. It is produced by implementing the method that is the subject matter of the invention of which is constituted by incorporating a layered structured shown in FIGS. 4A and 4B.

FIG. 4A shows a side cross sectional view of the display tag 300. The display tag, in accordance with the present invention, is improved so as to exhibit the ability to be used under harsh agricultural conditions. The tag comprises a thin, substantially, flat planar flexible display having a thickness 315, a front planar surface 305 and a back planar surface 306, both surfaces are substantially parallel to a longitudinal axis, X positioned between surfaces (in FIG. 4A); the front surface 305 is having a display section in which the livestock animal indicia is displayed. In some embodiments, a reflective film 440 provides animal identification during darkness. The reflective film optically active to glitter or shine during darkness. In an embodiment, the reflective film comprises a microprism retroreflective elements integrally bonded to a flexible, smooth-surfaced tough and weather resistant UV stabilized polymeric film.

FIG. 4B shows a side cross sectional view of the display tag 300 in accordance to some embodiments of the present invention. The tag comprises a thin, substantially, flat planar flexible display having a thickness 315, a front planar surface 305 and a back planar surface 306, both surfaces are substantially parallel to a longitudinal axis positioned between surfaces; the front surface 305 is having a display section in which the livestock animal indicia is displayed. The display tag comprises an opening or aperture 325. In the embodiments, the aperture is a punch out section cut from direction 326 defining an anchoring point for fixedly securing the improved display tag to a body part surface of the livestock animal. The improved livestock pasture display tag does not delaminate under harsh agricultural conditions.

The display tag 300 comprises a permanent pressure sensitive encapsulation zone (denoted as PZ in FIGS. 4A and 4B) 420 extending along the longitudinal axis between the back 306 and front surfaces 305 having a front side facing the front surface, defining a front section FS there-between and a front interface 455; and a back side facing the back surface, defining a back section BS there-between and a back interface 456, the permanent pressure sensitive encapsulation zone permanently bonds the front section at the front interface 455, the back section at the back interface 456, and accommodates a radio frequency identification component 360, the radio frequency identification component is permanently bonded between the back and front sections. In some embodiments, the zone comprises of acrylic based or rubber based permanent pressure sensitive adhesive.

In embodiments, the permanent pressure sensitive encapsulation zone is of thickness in the range of 10 micron to 50 micron (prior to incorporation of the electronic component). Following the encapsulation of the electronic component in PZ, the thickness can increase at approximately 100 to 200 micron. The thickness of the PZ is measured from front interface to the back interface.

The term "permanent" is defined as peel off resistance of at least 10 N/25 mm according to FINAT TM1 (FTM1) from glass substrate.

The permanent pressure sensitive encapsulation zone (denoted as PZ in FIG. 4A) therefore can be defined as the volume between the front interface 455 and the back interface 456.

Figure 4D:
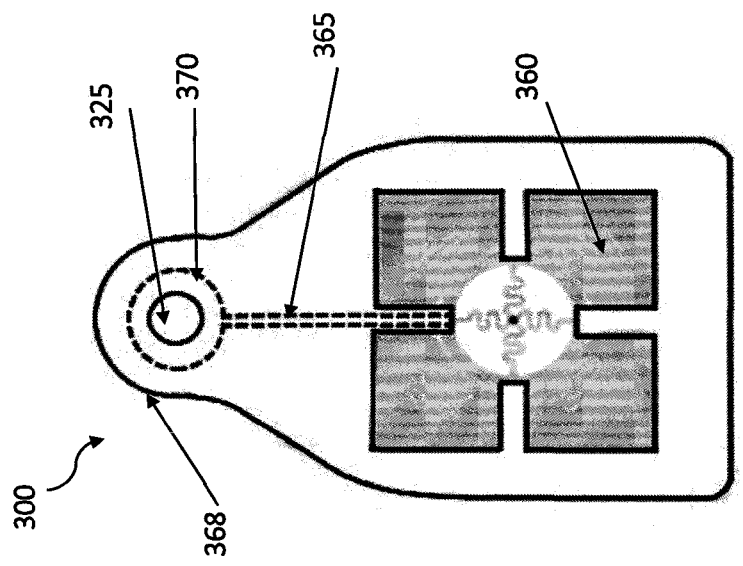
FIGS. 4C-4D show a plan view of the permanent pressure sensitive encapsulation zone of the improved display tag in accordance to some embodiments of the present invention.
Figure 4C:
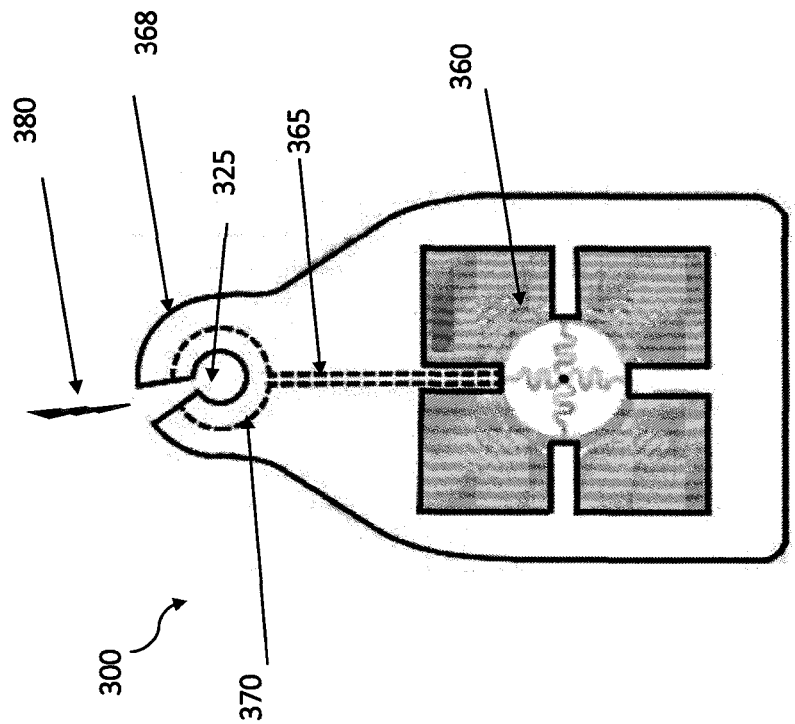

The electronic component 360 can have an electronic circuit loop 365 and a circuit sensitivity region 370, also shown in FIGS. 4C and 4D.

The improved display tag 300 can be manufactured by permanent bonding of the radio frequency identification component at the PZ by application of sufficient mechanical pressure onto the thickness of the permanent pressure sensitive encapsulation zone at a cool temperature range. Cool temperature range shall mean temperature in the range of 50° F. to 140° F. In an embodiment, the cool temperature range used is a room temperature (RT) range (60° F. to 90° F.). "Room temperature range" or "room temperature (RT) range" shall mean temperature in the range of 60° F. to 90° F.

The improved display tag 300 can also be manufactured by permanent bonding of the radio frequency identification component at the PZ by application of sufficient mechanical pressure onto the thickness of the permanent pressure sensitive encapsulation zone at a higher moderate temperature range as long as the thermoplastic layers of the improved display tag 300 remain un-melted and unfused. Moderate temperature range shall mean temperature in the range of 149° F. to 176° F.

In some embodiments, the back section BS comprises a support layer of a resilient and flexible thermoplastic material 410. As used herein "resilient thermoplastic material" shall mean a thermoplastic material having modulus higher than 2000 MPa according to ASTM D 882 e.g. polyethylene terephthalate (PET) and polycarbonate (PC) are resilient.

The resilient and flexible thermoplastic material can comprise polyethylene terephthalate (PET). The resilient and flexible thermoplastic material can comprise polyethylene terephthalate (PET) alone. The thickness of the resilient and flexible thermoplastic material can be in the range of 150 micron to 350 micron. In some embodiments, the thickness of the resilient and flexible thermoplastic material is 250 micron. The back section can consist of polyethylene terephthalate (PET) alone.

The front section FS can comprise a flexible thermoplastic material 430. The front section, in an embodiment, comprises a vinyl, poly vinyl or Polyvinyl chloride (PVC) 430. The flexible thermoplastic material can be printed with indicia with information relating to the animal being tagged. The printed material can be over laminated with clear UV blocking PET in order to protect the printed data.

The thickness of the flexible thermoplastic material in the FS can be in the range of 50 micron to 100 micron. In an object of the invention, the overall thickness of the display tag 300 is substantially reduced in comparison to the previously known techniques. Therefore, the overall thickness measured from the front surface to the back surface can be in the range of 450 microns to 1 mm. In some embodiments, the overall thickness measured from the front surface to the back surface can be below 750 microns.

The permanent pressure sensitive encapsulation zone PZ is un-melted during manufacturing and in the final product. The permanent pressure sensitive encapsulation zone PZ can completely separate the front section from the back section. The manufacturing process of the present invention provide for the FS to remain un-melted as well as the BS to remain un-melted. Thus, the BS/PZ/FS multilayer components all remain below the melting point of each of the multilayer components.

The PZ layer incorporates and encapsulates the radio frequency identification component. In some embodiments, the radio frequency identification component is passive UHF identification component, passive HF identification component or other radio frequency passive sensor.

FIGS. 4C and 4D shows a plan view of the permanent pressure sensitive encapsulation zone PZ of the improved display tag 300 in accordance to some embodiments of the present invention. The permanent pressure sensitive encapsulation zone 420 shows an exemplary encapsulation of an electronic component 360. The improved display tag of provides a display tag tear attempt indication. The display tag tear attempt indication is electronically based as follows. The electronic component 360 has an electronic circuit loop 365 and a circuit sensitivity region 370. The display tag tear attempt indication can be generated via circuit disconnection 380. In some embodiments, the sensitivity region 370 is in the circuit loop circumventing at least a portion of the punch out section 325 such that tear attempt of the punch out section disconnects the circuit loop at the sensitivity region. This technique can be used to detect tear attempts at the proximal region 368 of the display tag. The electronic circuit disconnection is indicative of the tag tear attempt. Several materials such as conductive materials can be employed in the manufacturing of the circuit loop 365.

The skilled artisan would know which materials to employ and the production techniques to embed the electronic circuit loop. By way of non-limiting example, the circuit loop can be produced from conductive metal alloy in printed circuitry PCBs. The circuit is conventionally printed using circuit techniques to form circuit conductive loops that can be are etched from the cladding procedures of electronic boards production. The circuit loop including the sensitivity region can be manufacture as a single unit with the electronic component 360. Alternatively and in a non-limiting, the circuit loop can employ polymeric or other advanced conductive films known to the skilled artisan.

Figure 5A:
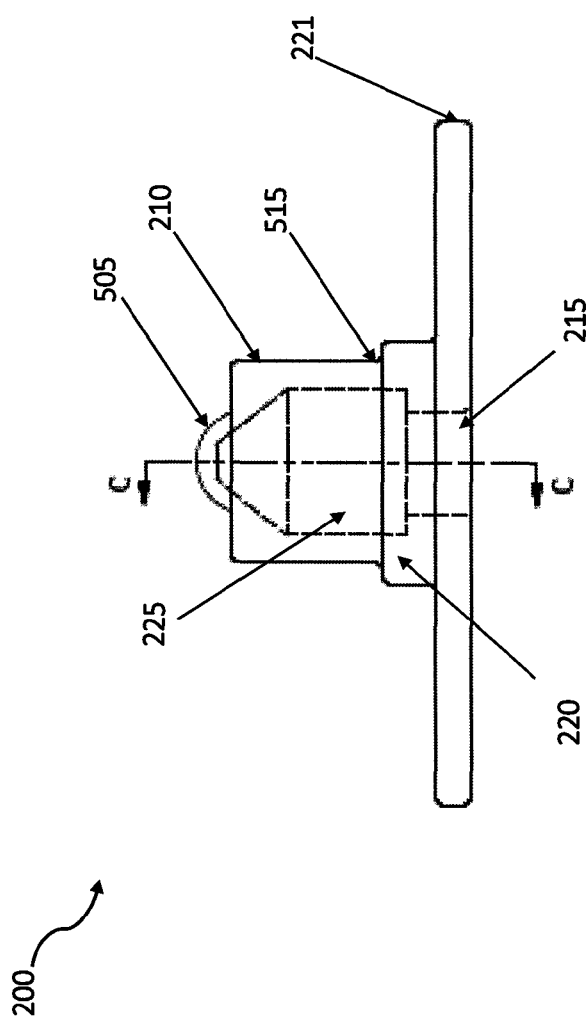
FIG. 5A is a front view of an anchor in accordance with some embodiments or the present invention.

FIG. 5A is a front view of an anchor 200 in accordance with some embodiments or the present invention. Anchor 200 includes a circumferential flange 221 projecting from an outer surface of the body 210. The anchor can be manufactured from various materials such as but not limited to polyurethanes, acetyl resins and alike. In some embodiments, anchor is manufactured from thermoplastic polyurethane (TPU) or other thermoplastic elastomer (TPE). The dimensions of the anchor 200 are typically have the size to fit commonly used male piercing parts having elongated shafts as shown in FIGS. 1 and 3. Anchor 200 includes a main-body 220, a central opening 215 for allowing directed entry of the male piercing member 100 there through. The anchor can comprise an animal protective cap 505 to prevent the male piercing element entry to inner lumen of the anchor to have contact point with the animal.

FIG. 5B is a cross sectional view at plane C-C of an anchor 200 in accordance with some embodiments or the present invention. The anchor 200 also includes an anchoring inner shoulder 540 within the central opening or aperture 215 which defines a first diameter and a second larger diameter. In FIG. 5B, the first diameter is denoted as d1 555 and the second diameter is denoted as d2. During mounting procedure, the male piercing member is passed through the central opening 215 of the anchor 200 about the location of the first diameter. The retention surface 120 of the male piercing member typically has a larger diameter that first diameter but is of lesser diameter compared to the second diameter d2 535 located at lateral extension element 550 of the shoulder. The shoulder contacts the retention surface so as to prevent passage of the retention surface in a longitudinal direction while permitting passage in an opposite direction.

The anchor comprises inner lumen 545 which is utilized to maintain and bear the male piercing member following the entry through the opening 215.

FIG. 5C is a front view of an anchor 200 in accordance with some embodiments or the present invention. The male piercing member has a pointed head 110 and a base 102. The base comprises a circumferential flange capable to minor contraction of the inner lumen 554 to allow minor width adaptation and facilitate entry of the male piercing member to the anchor. The pointed head is typically sufficiently sharp to enable easy cut through to the animal tissue. The male piercing member has a retention surface 120. The retention surface is spaced from the pointing head 110. The diameter of the retention surface 120 is greater from the diameter of the elongated shaft 103 section in adjacency. The diameter of the shaft 103 is smaller than the diameter of the retention surface 120 mediated via shoulder 552.

FIG. 5D is a cross sectional view at plane A-A of a male piercing member 100 in accordance with some embodiments or the present invention. The male piercing member has a pointed head 110 and an elongated shaft 103 a base 102. The pointed head is typically sufficiently sharp. In some embodiments, the pointed head is made from metal or rigid plastics like polycarbonate or polyamide to enable easy cut through to the animal tissue. The male piercing member has a retention surface 120.

FIG. 6 shows a schematic manufacturing machine of the improved livestock display tag in accordance with an embodiment. The front section layered material 611 such as a thermoplastic layer having a bottom side and a top side;

and a permanent pressure sensitive encapsulation layer coating at least a portion of the thermoplastic layer is released from an unwinding roller 610. Layered strip 612 having embedded electronic component(s) in tandem is released from an unwinding roller 620. The back section material 613 such as resilient thermoplastic layer having a bottom side and a top side is released from an unwinding roller 630.

The layered strip 612 carrying the electronic components pass through applicator 640 which de-laminates the electronic components from a release layer and apply those components on the resilient thermoplastic layer 613 thereby obtaining layered strip 613A carrying the electronic components. Layered strip 613A carrying the electronic components and front section layered material 611 are passed through laminator 660 and forcibly pressed by application of sufficient mechanical pressure onto the thickness of the permanent pressure sensitive encapsulation layer, thereby obtaining a tri-layered laminate comprising a permanent encapsulation zone which accommodates the electronic components.

The tri-layered laminate 660A is passed through cutting toll 670. Individual improved livestock animal tags 700 are die cut typically in a rectangular-like shape and shaped to expose the anchoring section discussed herein. The die cut livestock animal tags are collected on conveyor belt 690. The improved livestock animal tags can be die cut in different shapes such as polygons and the like. The residual of the die cut layered strip 660A can now be continuously collected (rewound) on roll 680.

The improved livestock animal tags generally share the cross section structure being illustrated in FIGS. 4A, 4B, 4E and 4F as discussed in the text accompanying the drawings.

In accordance to the present invention, the components/layers of the improved display tag are bonded by subjecting them to pressure at cool temperature range to bring the interfaces of the components into intimate contact to form a bond. Where moderate temperatures are used in the application they refer to temperatures substantially below the melting temperatures of the unfused permanent pressure sensitive adhesive utilized in the permanent pressure sensitive encapsulation zone. In some embodiments, the temperature during the formation of the bond will be maintained between 50° F. and 140° F. (not exceeding 140° F.).

Pressures in the range from about 0.5 psi to about 5 psi are particularly suitable in the present invention reel to reel bonding procedures. The particular amount of pressure required to form the bond between the components will depend on several factors as temperature, thickness of the tag as a whole and particular components thereof, and time in which pressure is applied. In general, the thinner the tag the less pressure is required for bonding the tag components. The greater the topography of the tag components, the greater the exposure time of pressure. For continuous production techniques short exposure time is required. In general, a sufficient bond can be formed in condition where pressure is applied for about less than 100 millisecond.

METHODS & EXAMPLES

Manufacturing Procedures

The manufacturing process is performed using multilayer specially adapted to continuous roll to roll. In this respect, the manufacturing process is adapted and configured for lamination in cool temperature range. The lamination process is performed without heat-sealing any of the laminated layers during manufacture and the final product.

The continuous roll to roll fabrication has a more stable production compared to conventional molding/melting/heat-sealing/welding technics and all the manufacturing process can be done in one run. The improved tag production therefore combines the benefits of fast mass production, automatic and punctual quality control, high quality printing, low cost and easy shape changing, fast and accurate personalization process.

Display tag, as shown herein, can be manufactured from combination of tough thermoplastic films for use as substrates and flexible softer thermoplastic layers for encapsulating the electronic component embedded there-between.

As used herein, "harsh agricultural environment" or "HAE" includes the accumulating of conditions as follows:

(1) being fixedly secured to a body part surface of at least 20 livestock animals in farm facility sharing a closed agricultural perimeter and being subjected to rough mechanical stresses and UV exposures resulting from livestock daily farm routines; and (2) not delaminating after at least 6 months of such use.

The improved livestock pasture display tag was subjected to mechanical and toughness tests which follows:

(1) Class a tests—mechanical stress tests:
 a. Resistance to tensile load of 280 N minimum; and
 b. No detrimental effect after at least 1000 hours at UVA 340 nm fluorescent tubes exposure in chamber fitted in accordance to American Society for Testing & Materials (ASTM) G154.

(2) Class B tests—inlay embedded indicia/print resistance to:
 a. Intentional mechanical rupture, tear, delaminating and snag of the improved livestock pasture display tag—12 months agricultural experimental use; and
 b. Resistance to abrasion according to ASTM D5181.

(3) Class C tests—
 a. Resistance to impact at low and moderate temperature with no integrity cracks or splits. The test is done by Free-Falling Dart method according to ASTM D1709;
 b. Resistance to damp heat and cold—alternating cycles of 12 hours at 40° C. and 12 hours at −25° C. for 3 weeks in a climatic chamber, according to ISO 4611; and
 c. Resistance to chemicals—immersion for 3 weeks in a 50° C. acid liquid (pH 3) and in a 50° C. alkaline liquid (pH 12), according to ISO 175.

Example 1

A standard prefabricated clear PET film at thickness of 250 microns (ASTROLL film made by KOLON Industries) was tested as the back section/layer substrate of the improved livestock pasture display tag. The clear PET sheet was mounted on a first feeding reel for continuous reel to reel process. The PET sheet is coated with dispersion of acrylic based permanent pressure sensitive adhesive (Polyacrylate made by ORAFOL GmbH) preparation PZ making an interface layer between the clear PET layer and the PZ layer. The thickness of the PZ layer was approximately 30 microns (before fixating an electronic component). The top exposed PZ layer, the top interface, was configured to receive a top thermoplastic film. The top thermoplastic film was selected—double-sided colored PVC sheet, see below.

Passive UHF RFID inlays were positioned and fixated on the PZ layer at equal spaced apart positions and pitch.

A double-sided colored PVC film at thickness of 75 micron was used (ORACAL made by ORAFOL GmbH).

The PVC film was mounted on a second feeding reel for the continuous reel to reel process.

The continuous PET film and the continuous PVC film were controllably motor-pulled and brought at velocity of 20 m/min in parallel feeding pathways to the inlet of a pressure applying laminator. The laminator had a single pressure roll which was un-heated and kept in room temperature of approximately 77° F. A single run was made at pressure of 5 psi.

The laminator achieved intimate contact between the PET film and the continuous PVC film to form the mechanical bond of the PET/PZ/PVC layers. The laminator bonded the PVC film to cover and encapsulate the UHF RFID component placed of the PET film.

The reel to reel lamination process was performed at cool temperature range of without any application of heat, keeping the thermoplastic layers and the PZ layer un-melted (during lamination and afterwards in the final product). The laminator output was rolled on a third output roll (PET/PZ/PVC multilayer laminated sheet).

TABLE 1

Preparation of PET/PZ/PVC multilayer

| | |
|---|---|
| Laminator Speed (m/min) | 20 |
| Multilayer Weight (g/cm$^2$) | <0.1 |
| Manufacture Temperature (*F.) | 77 (RT) |
| Laminator pressure | 5 psi |
| Tensile strength for HAE Class A(a) (−/+) | + |
| Class A(b) UV test (−/+) | + |
| Thickness | 450 micron |

Notes:
"−" failure/"+" success

The electronic component encapsulated in the output multilayer structure was passed through electronic encoding stage in order to encode data into the Integrated Circuit (IC) memory. The colored PVC film allowed printing of visual data there-upon.

Example 2

A UV blocking PET film at thickness of 23 micron was used (overlaminating PET with solvent based acrylate adhesive made by FASSON/AVERY DENNISON). The UV blocking PET film was mounted on a first feeding reel for a second continuous reel to reel process. Utilizing the reel to reel process, the UV blocking PET film is configured to protect the printed PET/PZ/PVC multilayer of Example 1 from outdoor conditions and from mechanical scratches.

The UV blocking PET film is coated with dispersion of acrylic based permanent pressure sensitive adhesive preparation. The thickness of the adhesive preparation was approximately 20 microns.

The PET/PZ/PVC multilayer laminated film of Example 1 (rolled on the third output reel) at thickness of about 450 micron was used. The PET/PZ/PVC multilayer was mounted on a second feeding reel for continuous reel to reel process.

The UV blocking PET film and the PET/PZ/PVC multilayer sheet were controllably motor-pulled and brought at velocity of 30 m/min in parallel feeding pathways to the inlet of a pressure applying laminator. The laminator had a single pressure roll which was un-heated and kept in room temperature of approximately 77° F. A single run was made at pressure of 5 psi.

The laminator achieved intimate contact and formed the mechanical bond of the PET/PZ/PVC layers with the UV blocking PET film.

The reel to reel lamination process was performed within a cool temperature range, 77° F., without any application of heat (without welding/heat sealing whatsoever) in keeping the thermoplastic layers and the PZ layer un-melted (during lamination and afterwards in the final product). The laminator output was rolled on a third output roll. The final stage is die cutting the output material into the desire tag shape.

TABLE 2

Preparation of improved livestock pasture display tag multilayer

| | |
|---|---|
| Laminator Speed (m/min) | 30 |
| Multilayer Weight (g/cm$^2$) | <0.1 |
| Manufacture Temperature (*F.) | 77 (RT) |
| Laminator pressure | 5 psi |
| Tensile strength for HAE Class A(a) (−/+) | + |
| Class A(b) UV test (−/+) | + |
| Thickness | 480 micron |

The results of physical testing on the resulting improved livestock pasture display tag multilayer are shown in Table 2. It was not possible to pull off or to peel any of the bonded layers before the substrate elongated and failed in tension i.e. complete physical integrity destruction. This indicates that the bonded tag multilayer is sufficiently tough for HAE condition.

Example 3

The procedures of Example 1 and 2 were repeated in the same materials and conditions but-for used of rubber based permanent pressure sensitive adhesive preparation making an interface layer between the clear PET layer and the PZ layer. The product based on the same procedures achieved the about the same results indicating suitability for EAD conditions utilization.

Example 4

The procedures of Example 1 and 2 were repeated in the same materials and conditions but-for the standard prefabricated clear PET film was replaced by white opaque PET film having thickness of 250 microns. The product based on the same procedures achieved the about the same results indicating suitability for EAD conditions utilization.

Example 5

Several configurations of the PET/PZ/PVC (3-layer) multilayer display tag were subjected to field test in cattle farms in South Africa during 6 months. The PET/PZ/PVC multilayer tags were fixedly secured to the ears of the farm cattle. Following prolonged duration of use, it became apparent that at extreme folding and front compression stress conditions, the PET/PZ/PVC (3-layer) display tag may accumulate folding line(s) across the surface of the tag and display disadvantageous deformed memory-like characteristics. The occurring folding lines inflicted mechanical and electrical deformations on the RFID device which is embedded in the PZ layer. In addition, the folding lines caused antenna and chip disconnections as well as reduced readability of the indicia ink printing on the PVC layer.

Thus, the multilayer was configured to prevent accumulation of fold lines during use while maintaining the important advantages of Roll to Roll manufacturing of un-melted layered structure in cool temperature range (without application of heat, as disclosed herein).

The front section, denoted as FS, was constructed from flexible thermoplastic bilayer which proved to substantially increase mechanical survival properties and withstand folding and front compression stresses. The thermoplastic front bilayer 442, 445 is illustrated in FIGS. 4E and 4F.

Structural Properties

FIGS. 4E and 4F shows a side cross sectional view of the display tag 300 in one embodiment of the present invention. The display tag, reinforced by flexible thermoplastic bilayer (442, 445), is improved so as to exhibit the ability to survive and withstand folding and front compression stresses. The display tag further prevents surface fold lines occurring as a result of livestock extreme usage.

Therefore, Tag 300 comprises a thin, substantially, flat planar flexible display having a thickness, a front planar surface 305 and a back planar surface 306, both surfaces are substantially parallel to an illustrative longitudinal axis, X positioned between surfaces (in FIG. 4E); the front surface 305 is having a display section in which the livestock animal indicia is displayed (not shown in FIGS. 4E and 4F).

FIG. 4F shows a side cross sectional view of the display tag 300 illustrating an aperture for use as an anchoring section 325. The tag comprises a thin, substantially, flat planar flexible display having a thickness 315, a front planar surface 305 and a back planar surface 306, both surfaces are substantially parallel to a longitudinal axis positioned between surfaces; the front surface 305 is having a display section in which the livestock animal indicia is displayed. The display tag comprises an opening or aperture 325. In the embodiments, the aperture is a punch out section cut from direction 326 defining an anchoring point for fixedly securing the improved display tag to a body part surface of the livestock animal.

The display tag 300 comprises a permanent pressure sensitive encapsulation zone 420 (denoted as PZ in FIGS. 4E and 4F) extending along the longitudinal axis between the back 306 and front surfaces 305 having a front side facing the front surface, defining a front section FS there-between, and a front interface 455; and a back side facing the back surface, defining a back section 410 BS there-between and a back interface 456. The FS comprises a thermoplastic front bilayer 442, 445. The permanent pressure sensitive encapsulation zone is of thickness in the range of 20 microns to 90 microns prior to encapsulation of the electronic component. In some embodiments, the overall weigh of the display tag is less than 0.15 gr/cm$^2$.

The permanent pressure sensitive encapsulation zone permanently bonds the front section at the front interface 455, the back section at the back interface 456, and accommodates a radio frequency identification component 360. The radio frequency identification component is permanently bonded between the back and front sections. The radio frequency identification component 360 can have an electronic circuit loop 365 and a circuit sensitivity region 370, also shown in FIGS. 4C and 4D. The zone can comprises acrylic based or rubber based permanent pressure sensitive adhesive.

In a one embodiment, the front section (FS) comprises flexible thermoplastic bilayer. The thermoplastic bilayer can be of thickness in the range of 300 micron to 550 micron. In other embodiments, the thermoplastic bilayer can be of thickness in the range of 500 micron to 750 micron.

The front section can comprise a thermoplastic bilayer of polyvinyl chloride (PVC) layer permanently bonded to a polyethylene terephthalate (PET) layer. The front section can further comprise a thermoplastic bilayer of polyvinyl chloride (PVC) layer permanently bonded to a polycarbonate (PC) layer.

In some embodiments, back section comprises a support layer of a resilient and flexible thermoplastic material of thickness in the range of 300 micron to 550 micron. In other embodiments, back section comprises a support layer of a resilient and flexible thermoplastic material of thickness in the range of 500 micron to 750 microns.

In one embodiment, the front section bilayer is separated by a laminated interface maintaining permanent bonding of the laminate. The front section can comprise a thermoplastic bilayer of polyvinyl chloride (PVC) layer of thickness in the range of 50 microns to 150 microns permanently bonded to polyethylene terephthalate (PET) layer of thickness in the range of 150 micron to 300 micron. The back section (BS) layer can comprise polyethylene terephthalate (PET) layer of thickness in the range of 300 micron to 500 micron. The permanent pressure sensitive encapsulation zone (PZ) can be of thickness in the range of 50 micron to 100 micron.

In a second embodiment, the front section (FS) comprises flexible thermoplastic bilayer. The front section bilayer is separated by a laminated interface maintaining permanent bonding of the laminate. The front section can comprise a thermoplastic bilayer of polyvinyl chloride (PVC) layer of thickness in the range of 50 micron to 150 micron permanently bonded to polycarbonate (PC) layer of thickness in the range of 450 micron to 550 micron. The back section (BS) can comprise polyethylene terephthalate (PET) of thickness in the range of 300 micron to 500 micron. The permanent pressure sensitive encapsulation zone (PZ) can be of thickness in the range of 50 microns to 100 micron.

In a third embodiment, the front section (FS) comprises flexible thermoplastic bilayer. The front section bilayer is separated by a laminated interface maintaining permanent bonding. The front section is a thermoplastic bilayer comprises a first and a second thermoplastic layer; (i) the first thermoplastic layer being selected from the group consisting of: polyethylene terephthalate (PET), polycarbonate (PC), polyvinyl chloride (PVC), and Polyurethane (PU) of thickness in the range of 100 micron to 550 micron; and (ii) the second thermoplastic layer being selected from the group consisting of: polyethylene terephthalate (PET), polyvinyl chloride (PVC), Polypropylene (PP), and Polyethylene (PE) of thickness in the range of 50 micron to 150 micron.

The back section (BS) can comprise one thermoplastic layer being selected from the group consisting of: polyethylene terephthalate (PET) layer, polyvinyl chloride (PVC) layer, polypropylene (PP) layer, polyethylene (PE) layer, and polycarbonate (PC) layer, of thickness in the range of 250 micron to 750 micron. The permanent pressure sensitive encapsulation zone (PZ) can of thickness in the range of 50 micron to 100 micron.

Manufacture and Field Test

The reel to reel procedures of Example 1 and 2 were repeated using each laminate material selection provided in Table 3. In general, a prefabricated resilient film was tested as the back section/layer substrate of the improved livestock pasture display tag. The resilient film was mounted on a first feeding reel for continuous reel to reel process. The resilient film was coated with dispersion of acrylic based permanent pressure sensitive adhesive (Polyacrylate made by ORAFOL GmbH) preparation PZ making an interface layer between the back section and the PZ layer. The thickness of the PZ layer was approximately about 80 micron (before fixating an electronic component). The top exposed PZ layer, the top interface, was configured to receive a top thermoplastic film as the front section (FS). The top thermoplastic film was selected—see Table 3 below.

Passive UHF RFID inlays were positioned and fixated on the PZ layer at equal spaced apart positions and pitch.

The top thermoplastic film, FS, was mounted on a second feeding reel for the continuous reel to reel process.

The laminator achieved intimate contact between the resilient film and the continuous top thermoplastic film to form the mechanical bond of the BS/PZ/FS layers.

The reel to reel lamination process was performed at cool temperature range of without any application of heat, keeping the thermoplastic layers and the PZ layer un-melted (during lamination and afterwards in the final product). The laminator output was rolled on a third output roll (BS/PZ/FS multilayer laminated sheet).

TABLE 3

Preparation of improved livestock pasture display tag multilayer

| | Front Section (FS) bilayer | PZ | Back Section (BS) |
|---|---|---|---|
| 1 | PET 250 micron/PVC-YELLOW 75 micron | dispersion of acrylic based permanent pressure sensitive adhesive—80 micron | PET 500 micron |
| 2 | PC 500 micron/PVC-YELLOW 75 micron | dispersion of acrylic based permanent pressure sensitive adhesive—80 micron layer | PET 350 micron |

The results of physical testing (Classes A, B and C) on the resulting improved livestock pasture display tag multilayer are shown in Table 4. It was not possible to pull off or to peel any of the bonded layers.

TABLE 4

Preparation of improved livestock pasture display tag multilayer

| | |
|---|---|
| Laminator Speed (m/min) | 30 |
| Multilayer Weight (g/cm²) | <0.15 |
| Manufacture Temperature (°F.) | 77 (RT) |
| Laminator pressure | 5 psi |
| Class A test (−/+) | + |
| Class B test (−/+) | + |
| Class C test (−/+) | + |
| Thickness | 900-1100 micron |

Notes:
"−" failure/"+" success

It will be appreciated by persons skilled in the art that the numerous variations and modifications will be envisaged to the animal identification tag and the method of manufacturing same, whilst still falling within the spirit of the invention as broadly hereinbefore described. All such variations and modifications should be considered to fall within the scope of this invention.

The invention claimed is:

1. An improved laminated livestock pasture display tag of a type used under harsh agricultural conditions, said improved laminated livestock pasture display tag comprising:
   (i) a thin, substantially, flat planar flexible display having a thickness, a front planar surface and a back planar surface, said front planar surface and said back planar surface being substantially parallel to a longitudinal axis positioned between said front planar surface and said back planar surface; at least one of a group consisting of said front planar surface and said back planar surface having a display section in which indicia for a livestock animal is displayed;
   (ii) an anchoring section for fixedly securing the improved laminated livestock pasture display tag to a body part of the livestock animal; and
   (iii) a permanent pressure sensitive encapsulation zone extending along the longitudinal axis between the back planar surface and the front planar surface having:
      a front side perimeter that is facing the front planar surface, defining a front section there-between and a front interface;
      a back side perimeter that is facing the back planar surface, defining a back section there-between and a back interface;
      the permanent pressure sensitive encapsulation zone configured to (1) permanently bond the front section at the front interface, and the back section at the back interface; and (2) accommodate at least one electronic component permanently bonded between the back section and the front section, said permanent bonding encapsulating said at least one electronic component
   wherein said front section is characterized by a multilayer structure with at least two layers, a material of at least one first layer of said at least two layers differing from a material of at least one second layer of said at least two layers, each of said at least two layers comprising a material selected from a group consisting of polyethylene terephthalate (PET), UV blocking PET, vinyl, polyvinyl, polyvinyl chloride (PVC), polycarbonate (PC), polypropylene (PP), polyethylene (PE), Polyurethane (PU) and any combination thereof, said at least one first layer having a thickness in a range between 100 micron and 550 micron and said at least one second layer having a thickness in a range between 50 micron and 150 micron; and said back section has at least one layer, said at least one layer comprising a member of a group consisting of PET, PVC, PP, PE, PC and any combination thereof;
   further wherein there is no detrimental effect on said improved laminated livestock pasture display tag after at least 1000 hours of exposure to 340 nm UV fluorescent tubes in a chamber fitted in accordance with American Society for Testing & Materials (ASTM) G154, said detrimental effect being pulling off or peeling off of any of the bonded layers.

2. The improved laminated livestock pasture display tag of claim 1, wherein the anchoring section is a punch out section configured to receive therethrough, a portion of a male piercing member comprising a pointed head and an elongate shaft extending from the head, the male piercing member has a retention surface to secure the improved laminated livestock pasture display tag to an anchor; characterized in that the improved laminated livestock pasture display tag is invasively fixable to soft tissue of said livestock animal.

3. The improved laminated livestock pasture display tag of claim 1, wherein the permanent bonding of the at least one electronic component is effected by application of sufficient mechanical pressure onto the thickness of the permanent pressure sensitive encapsulation zone at a cool temperature range.

4. The improved laminated livestock pasture display tag of claim 3, wherein said cool temperature range is between 50° F and 140° F.

5. The improved laminated livestock pasture display tag of claim 4, wherein said cool temperature range is a room temperature (RT) range.

6. The improved laminated livestock pasture display tag of claim 1, wherein the permanent pressure sensitive encapsulation zone is un-melted.

7. The improved laminated livestock pasture display tag of claim 1, wherein the back section is un-melted and the front section is un-melted.

8. The improved laminated livestock pasture display tag of claim 1, wherein the permanent pressure sensitive encapsulation zone comprises acrylic based or rubber based permanent pressure sensitive adhesive.

9. The improved laminated livestock pasture display tag of claim 1, wherein the permanent pressure sensitive encapsulation zone completely separates the front section from the back section.

10. The improved laminated livestock pasture display tag of claim 9, wherein the front section is not fused with the back section.

11. The improved laminated livestock pasture display tag of claim 1, wherein the back section comprises a support layer of a resilient and flexible thermoplastic material.

12. The improved laminated livestock pasture display tag of claim 11, wherein the resilient and flexible thermoplastic material is polyethylene terephthalate (PET).

13. The improved laminated livestock pasture display tag of claim 11, wherein the thickness of the resilient and flexible thermoplastic material is in the range of 150micron to 500 micron.

14. The improved laminated livestock pasture display tag of claim 1, wherein the improved laminated livestock pasture display tag does not delaminate under harsh agricultural conditions.

15. The improved laminated livestock pasture display tag of claim 1, wherein the improved laminated livestock pasture display tag is configured to pass at least one toughness test selected from a group consisting of: (a) resistance to a tensile load at least 280 N; (b) no mechanical rupture, tear, delamination and snag after 12 months agricultural experimental use; (c) resistance to abrasion according to ASTM D5181; (d) no integrity cracks or splits at low and moderate temperatures when tested using the ASTM D1709 Free-Falling Dart method; (e) no damage from damp heat and cold when tested according to ISO 4611using alternating cycles of 12 hours at 40° C. and 12 hours at −25° C. for 3 weeks in a climatic chamber; (f) no damage from chemicals when tested according to ISO 175 using immersion for 3 weeks in a 50° C. acid liquid (pH 3); (g) no damage from chemicals when tested according to ISO 175 using immersion for 3 weeks in a 50° C. alkaline liquid (pH 12) and any combination thereof.

16. The improved laminated livestock pasture display tag of claim 1, wherein the permanent pressure sensitive encapsulation zone is of thickness in the range of 10 micron to 50 micron prior to encapsulation of the at least one electronic component.

17. The improved laminated livestock pasture display tag of claim 1, wherein the overall thickness measured from the front surface to the back surface is 450microns to 1 mm.

18. The improved laminated livestock pasture display tag of claim 1, wherein the overall weight of the improved laminated livestock pasture display tag is less than 3 gm.

19. The improved laminated livestock pasture display tag of claim 1, wherein the overall weight of the improved laminated livestock pasture display tag is less than 0.1 gm/cm².

20. The improved laminated livestock pasture display tag of claim 1, wherein the improved laminated livestock pasture display tag is configured to prevent accumulation of fold lines.

21. The improved laminated livestock pasture display tag of claim 1, wherein the permanent pressure sensitive encapsulation zone is of thickness in the range of 20 micron to 200 micron prior to encapsulation of the at least one electronic component.

22. The improved laminated livestock pasture display tag of claim 21, wherein the back section has a thickness in a range from 300 micron to 750 micron.

23. The improved laminated livestock pasture display tag of claim 21, wherein the overall weight of the improved laminated livestock pasture display tag is less than 8 gm.

24. The improved laminated livestock pasture display tag of claim 21, wherein the overall thickness measured from the front surface to the back surface is 450micron to 1500 micron.

25. The improved laminated livestock pasture display tag of claim 1, wherein the overall weight of the improved laminated livestock pasture display tag is less than 0.15 gm/cm².

26. The improved laminated livestock pasture display tag of claim 1, wherein said front section is characterized by a bilayer comprising a member of a group consisting of: a PVC layer laminated to a PET layer, and a PVC layer laminated to a polycarbonate (PC) layer.

27. The improved laminated livestock pasture display tag of claim 1, additionally comprising a tear attempt indication.

28. The improved laminated livestock pasture display tag of claim 27, wherein said tear attempt indication is generable by circuit disconnection at a circuit sensitivity region.

29. The improved laminated livestock pasture display tag of claim 28, wherein the circuit sensitivity region is a circuit loop encircling at least a portion of the anchoring section such that a tear attempt of the anchoring section disconnects the circuit loop; the disconnection of which is indicative of the tear attempt.

30. The improved laminated livestock pasture display tag of claim 1, wherein the at least one electronic component comprises an ultra-high frequency (UHF) Radio Frequency ID (RFID) identification component.

31. The improved laminated livestock pasture display tag of claim 1, wherein a member of a group consisting of said back section, said front section and any combination thereof is printed with indicia.

32. The improved laminated livestock pasture display tag of claim 31, wherein the indicia is printed in black or colored inks applied via digital printing, via flexography printing, via letterpress printing, via inkjet printing, or laser engraving.

33. The improved laminated livestock pasture display tag of claim 1, wherein at least a portion of the front section comprises a reflective film to provide identification of said livestock animal during darkness.

34. The improved laminated livestock pasture display tag of claim 1, wherein the improved laminated livestock pasture display tag is fabricated roll to roll.

35. The improved laminated livestock pasture display tag of claim 1, wherein said at least one electronic component comprises a radio frequency identification component.

* * * * *